United States Patent [19]
Henderson

[11] 3,825,027
[45] July 23, 1974

[54] AUTOMATIC MULTIPLE FUEL TANK CONTROL VALVE

[76] Inventor: Jack A. Henderson, 16208 Laurel Ridge Dr., Laurel, Md. 20810

[22] Filed: June 11, 1973

[21] Appl. No.: 368,832

[52] U.S. Cl.................. 137/265, 137/398, 137/512, 244/135 R
[51] Int. Cl........................ F16k 31/22, F16k 15/18
[58] Field of Search........... 137/111, 112, 113, 114, 137/256, 265, 267, 572, 398, 512, 433; 244/135 R, 135 C; 222/63, 66

[56] References Cited
UNITED STATES PATENTS

| | | | |
|---|---|---|---|
| 2,146,729 | 2/1939 | Gavin | 137/113 |
| 2,170,136 | 8/1939 | Gavin | 137/114 |
| 2,409,245 | 10/1946 | Black | 222/63 |
| 2,516,150 | 7/1950 | Samiran | 244/135 C |
| 2,557,438 | 6/1951 | Johnson | 137/256 |
| 2,980,295 | 4/1961 | Sacco | 222/66 |
| 3,158,193 | 11/1964 | Anderson | 137/113 X |

Primary Examiner—William R. Cline
Attorney, Agent, or Firm—Wallace E. Weakley

[57] ABSTRACT

A float controlled fuel tank control valve assembly is provided for automatically supplying fuel to an engine from one of several fuel tanks connected to the engine through a tank selector valve when the fuel in the selected tank is exhausted. The float controlled valve has a separate chamber containing a ball type float valve for each fuel tank in the fuel supply system. Fuel outlet passages communicating with a fuel pump open into the bottom of each chamber, with the fuel inlet passage from each fuel tank communicating with its corresponding chamber at a level above the outlet opening. A valve seat is provided in each chamber between the inlet and outlet openings for the float valve, so that the float valve will act to block the outlet passage when the fuel in the corresponding tank and chamber is exhausted. Spring biased one-way valves interconnecting the outlet passages are provided to permit the fuel from the tank containing fuel to be supplied to the tank selector valve or by-passed around the tank selector valve and supplied directly to the fuel pump.

11 Claims, 8 Drawing Figures

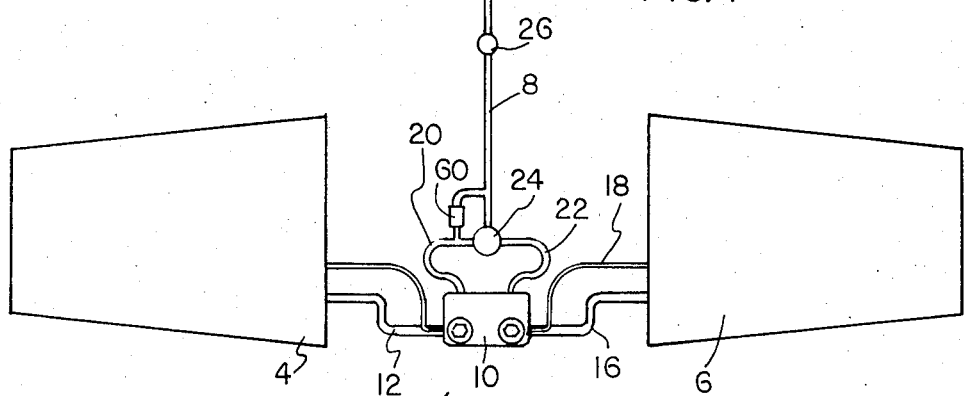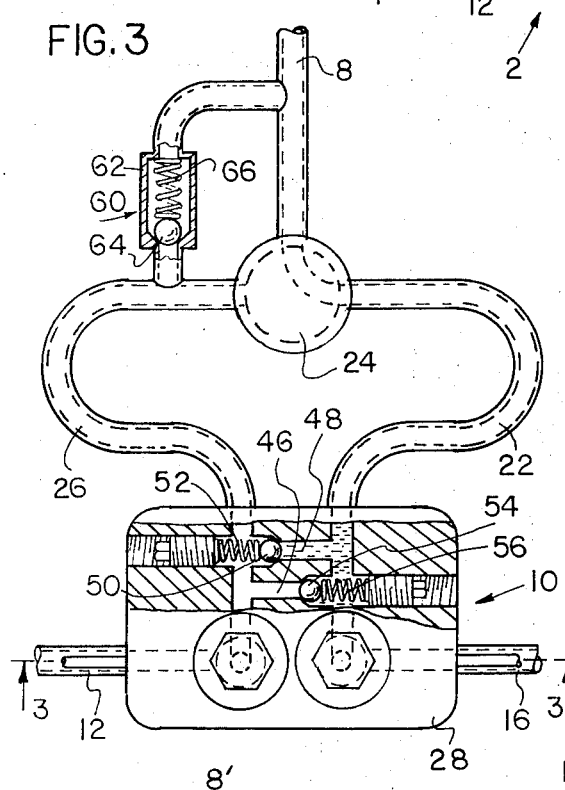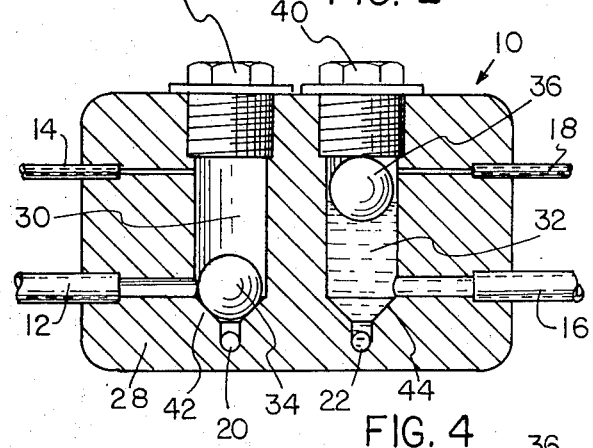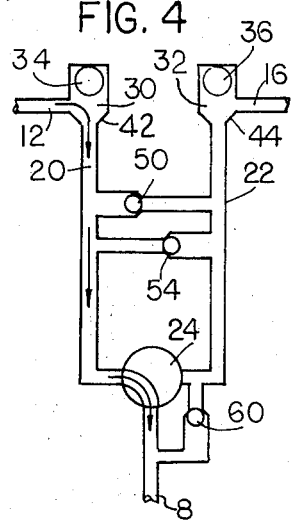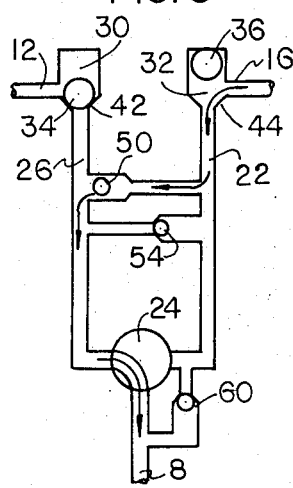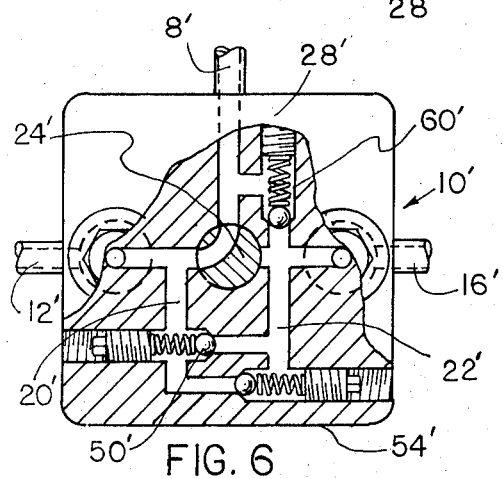

AUTOMATIC MULTIPLE FUEL TANK CONTROL VALVE

BACKGROUND OF THE INVENTION

1. Field of the Invention

This invention relates to a float operated fuel tank supply control valve for use in multiple tank fuel systems which allows fuel from a non-selected tank to be automatically supplied to a fuel pump in the event that the fuel in the selected tank is exhausted.

2. Description of the Prior Art

One of the major problems encountered in the field of general aviation, and primarily with small aircraft employing multiple tank fuel systems is engine fuel starvation, due to failure of the pilot to select a different tank when the fuel supply in a selected tank is exhausted. Multiple tank fuel supply systems usually employ a manually operated tank selector valve connected between each of the fuel tanks and a fuel pump for supplying fuel to the engine of the aircraft. The pilot selects the desired fuel tank by manually operating the tank selector valve to maintain the proper weight distribution in the aircraft as the fuel supply is exhausted.

In critical situations, such as landing or during critical maneuvers of the aircraft, problems often arise due to the pilot's failure to manually move the tank selector valve to a different tank when the fuel supply in the tank on which the aircraft is being operated is exhausted. This often has tragic results because of loss of engine power at a critical time, due to fuel starvation.

Several solutions to the problems of engine fuel starvation due to failure of the pilot of the aircraft to switch to a fresh fuel tank have been presented by the prior art. One proposal has been the use of complicated automatically controlled fuel tank selector valves which are automatically responsive to the fuel levels in each of the fuel tanks. Other proposed solutions have been automatic valves responsive to differential pressures between the fuel tank due to the fuel levels therein for automatically by-passing the manually operated selector valve.

One of the major drawbacks to each of the solutions to aircraft engine fuel starvation presented by the prior art devices has been high cost of manufacturing and installation, due to the rather complex design and construction of the assemblies. Another potential problem presented is the somewhat uncertain reliability of the devices because of the complexity of the device and number of components used therein. Therefore, no simple and inexpensive, yet satisfactory solution to the problem of preventing aircraft engine fuel starvation due to exhaustion of the fuel in a manually selected fuel tank has been presented by the prior art devices.

SUMMARY OF THE INVENTION

The present invention solves the problem of engine fuel starvation in general aviation due to failure to switch to another fuel tank by providing an automatic float controlled fuel tank valve to automatically by-pass the fuel tank selector valve to supply fuel from another tank when the fuel supply in the selected tank is exhausted.

The present invention presents a simple, inexpensive, yet highly reliable fuel tank control valve assembly for automatically supplying fuel from a non-selected fuel tank to the engine of the aircraft. The assembly will operate at flight angles of up to 60°.

A further advantage of the present invention is that it may be used with an aircraft fuel system having any number of individual fuel tanks, and can be constructed with a manual tank selector valve assembled integrally therewith.

The present invention presents a further advantage in that it is designed to be used as a retrofit in present aircraft fuel supply systems with a minimum amount of modification to the existing system.

The present invention also presents a complete aricraft fuel system employing a float controlled control valve assembly for automatically insuring a supply of fuel to an aircraft engine operating from a plurality of fuel tanks in the event that the fuel supply in the selected tank is exhausted during flight.

These and other advantages of the present invention will be seen upon reading the specification and viewing the drawings.

BRIEF DESCRIPTION OF THE DRAWINGS

FIG. 1 is a schematic illustration of an aircraft fuel system according to the present invention;

FIG. 2 is a vertical cross-sectional view of the automatic float controlled valve according to the present invention;

FIG. 3 is a horizontal view of the valve assembly according to the present invention showing the valve in partial cross-section;

FIGS. 4 and 5 are schematic illustrations showing the operation of the valve according to the present invention; and, FIG. 6 is a horizontal partial cross-sectional view of a further embodiment of the present invention.

DESCRIPTION OF THE PREFERRED EMBODIMENTS

Figure 7:
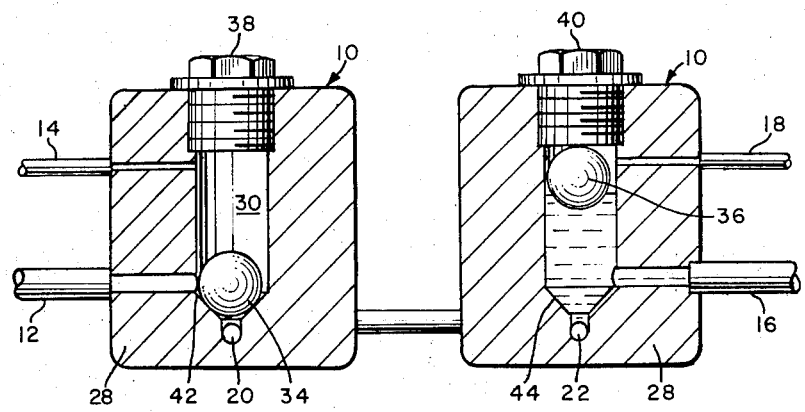
FIG. 7 is a vertical cross-sectional view of a further embodiment of the automatic float controlled valve according to the present invention; and, FIG. 8 is a horizontal partial sectional view of the further embodiment of the valve assembly according to the present invention illustrated in FIG. 7.

The several preferred embodiments of the present invention will now be described with reference to the accompanying drawings. Referring first to FIG. 1, a fuel supply system 2 constructed according to the present invention includes a first fuel tank 4 and a second fuel tank 6 connected to an engine fuel supply conduit 8 through an automatic float controlled valve means, shown as valve assembly 10.

The first tank 4 is connected to a first inlet of the float controlled valve assembly 10 through a first fuel passage or conduit 12, while the second fuel tank 6 is connected to a second inlet of the automatic float controlled valve assembly 10 through a second fuel passage or conduit 16. Internal chambers of the valve assembly 10 with which the fuel tank conduits 12 and 16 communicate are vented to the atmosphere or back into the fuel tanks 4 and 6 by vent lines 14 and 18, respectively. The details of the internal construction of the float controlled valve assembly 10 forms a part of the present invention and will be described hereinafter with reference to the remaining figures.

The outlets of the respective chambers in the valve assembly 10 communicating with the first and second fuel tanks 4 and 6 are connected through outlet passages or conduits 20 and 22, respectively, to a manually operated tank selector valve 24. The outlet of the manual tank selector valve 24 is connected to the inlet of a fuel pump 26 through the fuel supply line 8, as seen in FIG. 1.

An alternative embodiment of the present invention includes a one-way spring biased check valve 60 connected between one of the fuel outlet lines 20 and the fuel line 8 downstream of the manual tank selector vayve 24 to by-pass the selector valve 24, as will be more fully explained in detail hereinafter with reference to the remaining figures.

Referring now to FIGS. 2 and 3, one preferred embodiment of the float controlled automatic fuel valve assembly 10 will now be described. The valve assembly 10 includes a valve body or housing 28 having vertical bores 30 and 32 formed therein. The bores 30 and 32 may be formed in the housing 28 by casting, or by machining the bores 30 and 32 in the housing 28. The number of bores formed in the housing 28 correspond to the number of fuel tanks being used in the fuel supply system.

Float ball valves 34 and 36 are contained in each of the bores or float chambers 30 and 32, respectively. The tops of the float chambers or bores 30 and 32 are closed by means of plugs 38 and 40 which may be retained in the ends of the bores 30 and 32 by threads or by press-fitting therein.

Each of the fuel inlet conduits or passages 12 and 16 opens into its respective bore 30 and 32 along the sidewall thereof, with the fuel outlet conduits or passages 20 and 22 communicating with the bottom of their respective bores or chambers 30 and 32, respectively, as shown in FIG. 2. Valve seats 42 and 44 are formed in the respective chambers 30 and 32 between the inlet and outlet passage thereof, to permit the ball float valves 34 and 36 to block communication between the inlet and outlet passages 12 and 20 of valve chamber 30 and inlet and outlet passages 16 and 22 of valve chamber 32, respectively, when no fuel or liquid is present in the float chamber.

The vent passages or conduits 14 and 18 communicate with the top or upper end of the respective chambers 30 and 32 and vent these chambers to the atmosphere or into the respective fuel tanks 4 and 6, as illustrated in FIG. 1.

As will be seen in FIG. 3, the outlet passages 20 and 22 from the chambers 30 and 32 are connected with the inlet ports of a manually operated tank selector valve 24 by any suitable means, such as flexible or rigid fuel lines.

The outlet passages 20 and 22 are interconnected by means of a pair of one-way check valves 50 biased in the direction of their closed position by springs 52, as shown in FIG. 3. Each of the one-way check valves 50 blocks fuel flow in the opposite direction, thus permitting fuel to flow from one outlet passage to the other under certain operating conditions, which will be explained in detail hereinafter. The float controlled valve assembly 10 according to the present invention requires one pair of opposed flow one-way check valves connected in separate passages between each pair of valve chambers. Since the system described herein and illustrated in the accompanying drawings includes two individual fuel tanks 4 and 6, one pair of one-way check valves is required. However, if three separate fuel tanks were used, three pair of check valves would be required; four separate tanks require six pairs of one-way valves; five tanks require 10 pairs; etc.

An optional feature which may be incorporated into the fuel tank system and valve assembly according to the present invention is a one-way by-pass valve 60 connected around the manual tank selector valve 24, as shown in FIGS. 1 and 3. The purpose of the by-pass valve 60 is to assure a continuous flow of fuel to the engine in the event the pilot inadvertently selects the "off" or an intermediate position on the tank selector valve 24, as will be explained hereinafter in the description of the operation of the present invention. If the by-pass valve 60 is incorporated into the system, a firewall shut-off valve located between the engine and the by-pass valve 60 would be required to provide a means for shutting off fuel to the engine in an emergency.

FIG. 6 illustrates an alternative embodiment for the construction of the valve assembly 10 according to the present invention. The embodiment of FIG. 6 has the manual tank selector valve constructed integrally in the valve housing 28'. Accordingly, the manual selector valve has been designated by reference numeral 24'. In the same manner, each of the other corresponding elements are numbered with a prime (') added. The tank selector valve 24' is mounted in the valve housing 28' and communicated with each of the float ball valve chambers formed in the housing 28' via internal passages 20' and 22'. The one-way check valves 50' and 54' are contained within internal passages in the housing 28', as is the selector valve by-pass valve 60', as illustrated in FIG. 6.

Figure 8:
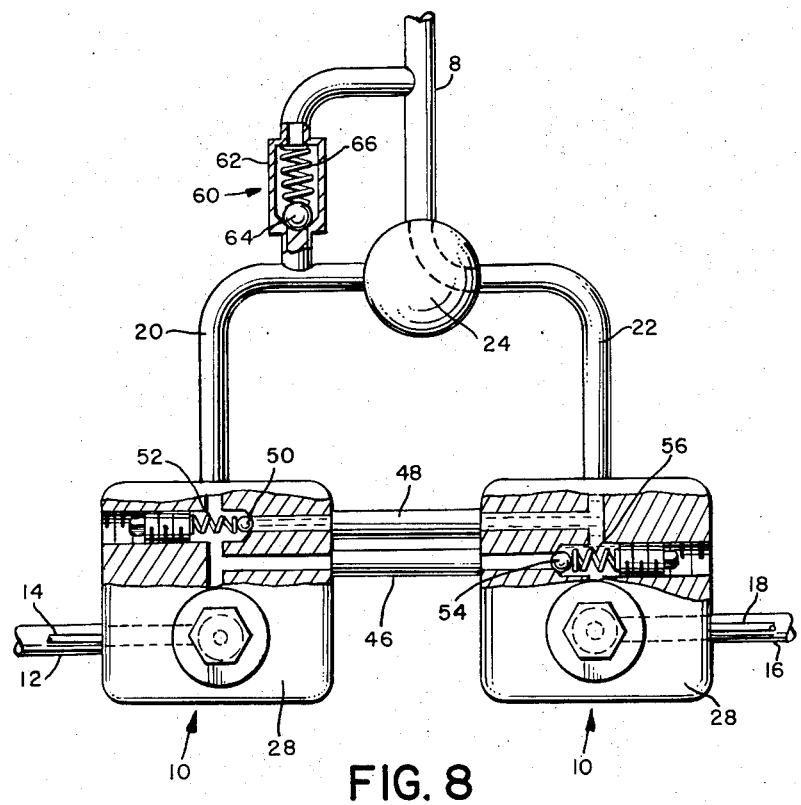

Although the embodiment of the present invention described herein above with reference to FIG. 2 of the drawings shows the float chambers 30 and 32 formed in the same housing, it is possible to form the float chambers 30 and 32 in separate housings, as illustrated in FIGS. 7 and 8 of the drawings. The operation of this embodiment will be the same as that as the embodiments described herein above.

The operation of the system and valve assembly according to the present invention will now be described with reference to FIGS. 1, 4, and 5. As shown in FIG. 4, the pilot of an aircraft moves the manual tank selector valve 24 to feed fuel from a desired tank (tank 4) to the aircraft engine. As illustrated, as long as fuel tank 4, connected to inlet passage 12, contains fuel, valve chamber 30 will be filled with fuel to a level sufficient to maintain float valve 34 raised away from the valve seat 42 at the bottom of chamber 30. Hence, fuel will be fed into the outlet passage 20 and through the tank selector valve 24 to the aircraft engine (not shown) by the fuel pump 26. Both of the one-way check valves 50 and 54 will remain in their closed positions due to the force of biasing springs 52 and 56 thereon.

In the same manner, the float valve 36 in the second chamber 32 is also maintained in its raised position in chamber 32 away from seat 44 at the lower end of chamber 32 by fuel from tank 6 supplied through inlet passage 16. However, no fuel is conveyed through outlet passage 22 from chamber 32, since the manual tank selector valve blocks communication of outlet passage 22 with the fuel pump supply line 8, as shown in FIG. 4. The fuel supply system 2 and valve assembly 10 will operate in a normal manner, as shown in FIG. 4. Fuel will pass from tank 4 through inlet passage 12 into float chamber 30. With the ball float valve 34 maintained in its raised, open position away from valve seat 42 by the fuel in chamber 30, fuel will flow through outlet passage 20 and through the tank selector valve 24 into the fuel pump supply conduit 8.

When the supply of fuel in fuel tank 4 connected to float chamber 30 is exhausted, the fuel contained in chamber 30 will also be exhausted, thereby allowing float valve 34 to drop onto valve seat 42 and block communication with outlet passage 20.

When outlet passage 20 is blocked by float valve 34 seating against valve seat 42 in valve chamber 30, a vacuum will be created in outlet passage 20 by the suction of the fuel pump 26 connected to fuel supply line 8. The vacuum in outlet passage 20 due to the lack of fuel therein will cause one-way check valve 50 to open against the closing force of biasing spring 52 thereagainst, and allow fuel to flow from the second outlet passage 22 connected to the second float chamber 32, into outlet passage 20, as shown in the schematic illustration of FIG. 5. The opening of the one-way check valve 50 allows the fuel supply to automatically be supplied from the second fuel tank 6 through the second float chamber 32.

If the manual tank selector valve 24 is positioned to connect outlet passage 22 with the fuel pump supply line 8, the same automatic operation described hereinabove will be carried out by the second float chamber 32, float valve 36, and one-way spring biased check valve 54, in the event the supply of fuel from tank 6, connected to the second valve chamber 32 via inlet passage 16 is exhausted.

The closing force of the springs 52 and 56 against the ball check valves 50 and 54 are calibrated according to the amount of vacuum created in the outlet passages 20 and 22 by the fuel pump 26 when the fuel tanks are empty. The force of the springs 52 and 56 must be sufficient to maintain the ball check valve 50 and 54 in their closed positions under normal operating conditions to prevent fuel from being drawn from the non-selected tank or tanks, while permitting the valves 50 and 54 to open when the fuel supply in the selected tank is exhausted to supply fuel from the non-selected tank through the one-way check valve into the outlet passage of the valve chamber connected to the selected tank.

In the event that the volume of fuel flowing through either of the one-way check valves 50 or 54 is not adequate to supply the operating requirements of the aircraft engine, it may be necessary to connect a one-way by-pass valve around the manual selector valve 24, as described hereinabove. Thus when the manual selector valve 24 is positioned as shown in FIGS. 3, 4, and 5, and the supply of fuel in tank 4 connected to inlet conduit 12 is exhausted, the fuel will be supplied from the second tank 6 through the second float chamber 32 into second outlet passage 22. The fuel will then be conveyed from the second outlet passage 22 through one-way check valve 50 into first outlet passage 20, as illustrated in FIG. 5 and described previously. Should the pilot inadvertently move the tank selector valve 24 to the "off" position or place the valve 24 in an intermediate position between two tanks, thereby interrupting the flow of fuel to the engine, the one-way check valve 60 will open to permit the fuel flow to by-pass the tank selector valve 24, thereby maintaining fuel flow to the engine.

Although the preferred embodiment of the present invention have been described in combination with an aircraft fuel supply system, it is obvious to one skilled in the art of fluid handling devices and systems that the present invention is applicable for use in any type of fluid supply system where a continuous supply of fluid must be maintained from a plurality of individual tanks.

What is claimed is:

1. An automatic liquid supply control valve for use in a multiple tank liquid supply system having a tank selector valve comprising: at least a first and a second valve chamber; separate inlet passage means opening into each valve chamber, each inlet passage means adapted to communicate with a separate tank; separate outlet passage means opening into the bottom of each of said valve chambers below the opening of said inlet passage means; a valve seat located in each of said valve chambers between the openings of said inlet and said outlet passage means; a float valve movably contained in each of said valve chambers, each of said float valves adapted to seat against its corresponding valve seat to block the opening of the corresponding outlet passage means when no liquid is present in the corresponding valve chamber; passage means intercommunicating each of said outlet passage means; first and second biased one-way valve means located separately in said intercommunicating passage means, said first and second biased one-way valve means being in parallel, opposed flow relationship with each other to permit flow from the outlet passage means of a valve chamber connected to a non-selected tank to the outlet passage means of a valve chamber connected to a selected tank when the liquid supply in a selected tank is exhausted and the corresponding float valve blocks the outlet passage from the corresponding float chamber.

2. An automatic liquid supply control valve as claimed in claim 1, wherein each of said float valves is of a spherical configuration, and each of said valve seats have an inwardly tapering, circular cross-sectional configuration to allow the corresponding float valve to sealingly rest thereon when no liquid is present in the corresponding valve chamber.

3. An automatic liquid supply control valve as claimed in claim 1, wherein each of said valve chambers is of a vertical cylindrical configuration, each float valve having a spherical configuration and adapted for cooperation with an inwardly tapering valve seat positioned at the bottom of each cylindrical valve chamber.

4. An automatic liquid supply control valve as claimed in claim 1, wherein each valve chamber is formed in the same housing.

5. An automatic liquid supply control valve as claimed in claim 1, wherein each valve chamber is formed in a separate housing.

6. An automatic liquid supply control valve as claimed in claim 1, further comprising a one-way by-pass valve means, the inlet of said one-way by-pass valve means communicating with one of said outlet passage means downstream of said biased one-way valve means and the outlet connected with a liquid supply conduit downstream of a tank selector valve, whereby, liquid will flow through said one-way by-pass valve and by-pass said tank selector valve to supplement the liquid flow through said tank selector valve.

7. An automatic multiple tank liquid supply system adapted for use as an aircraft fuel supply system comprising; at least a first and a second liquid supply tank; a tank selector valve connected with each of said tanks; an automatic liquid supply control valve means connected between each of said tanks and said tank selector valve; said automatic liquid control valve means including at least a first and a second valve chamber; separate inlet passage means opening into each valve chamber; inlet conduit means connecting said first and second tanks with said inlet passage means of said first and second valve chambers, respectively; separate outlet passage means opening into the bottom of each of said valve chambers below the openings of said inlet passage means; a valve seat located in each of said valve chambers between the openings of said inlet and said outlet passage means; a float valve movably contained in each of said valve chambers, each float valve adapted to seat against its corresponding valve seat to block the opening of the corresponding outlet passage means when no liquid is present in the corresponding valve chamber; passage means intercommunicating each of said outlet passage means; first and second biased one-way valve means located separately in said intercommunicating passage means, said first and second biased one-way valve means being in parallel, opposed flow relationship with each other to permit flow from the outlet passage means of the valve chamber connected to a selected tank when the liquid supply in a selected tank is exhausted and the corresponding float valve blocks the outlet passage from the corresponding float chamber.

8. A liquid supply system as set forth in claim 7, wherein each of said float valves is of a spherical configuration, and each of said valve seats has an inwardly tapering, circular cross-sectional configuration to allow the corresponding float valve to sealingly rest thereon when no liquid is present in the corresponding valve chamber.

9. A liquid supply system as set forth in claim 7, wherein each valve chamber is formed in the same housing.

10. A liquid supply system as set forth in claim 7, wherein each valve chamber is formed in a separate housing.

11. A liquid supply system as set forth in claim 7, further comprising a one-way by-pass valve means, the inlet of said one-way by-pass valve means communicating with one of said outlet passage means downstream of said biased one-way valve means and the outlet connected with a liquid supply conduit downstream of said tank selector valve, whereby, liquid will flow through said one-way by-pass valve and by-pass said tank selector valve when said tank selector valve is in a closed or an intermediate position.

* * * * *